G. A. JOHNSEN.
HORSE COLLAR.
APPLICATION FILED JAN. 26, 1918.
1,298,732.
Patented Apr. 1, 1919.
4 SHEETS—SHEET 1.
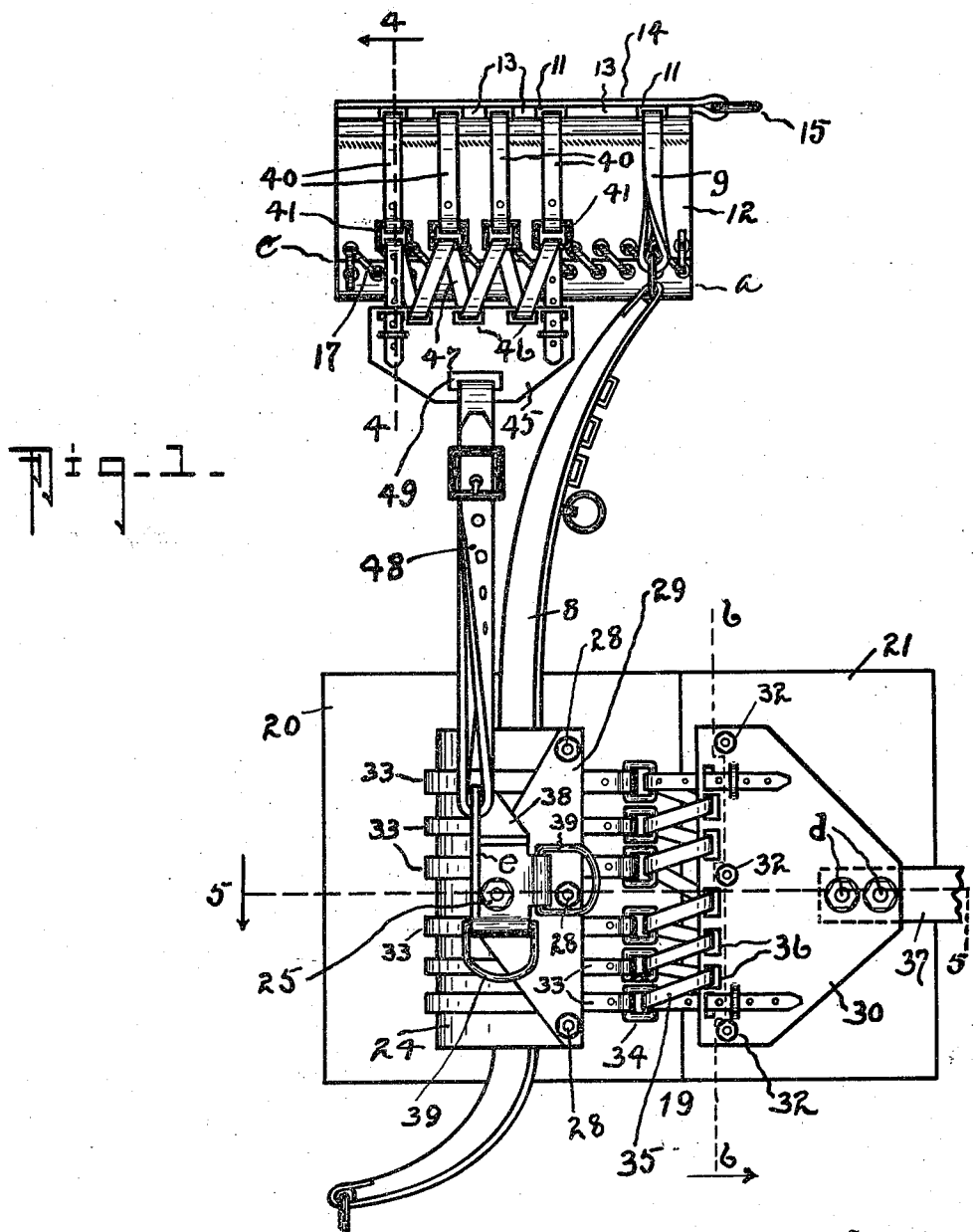
Inventor
Gustav A. Johnsen.
By Hiram A. Sturges,
Attorney

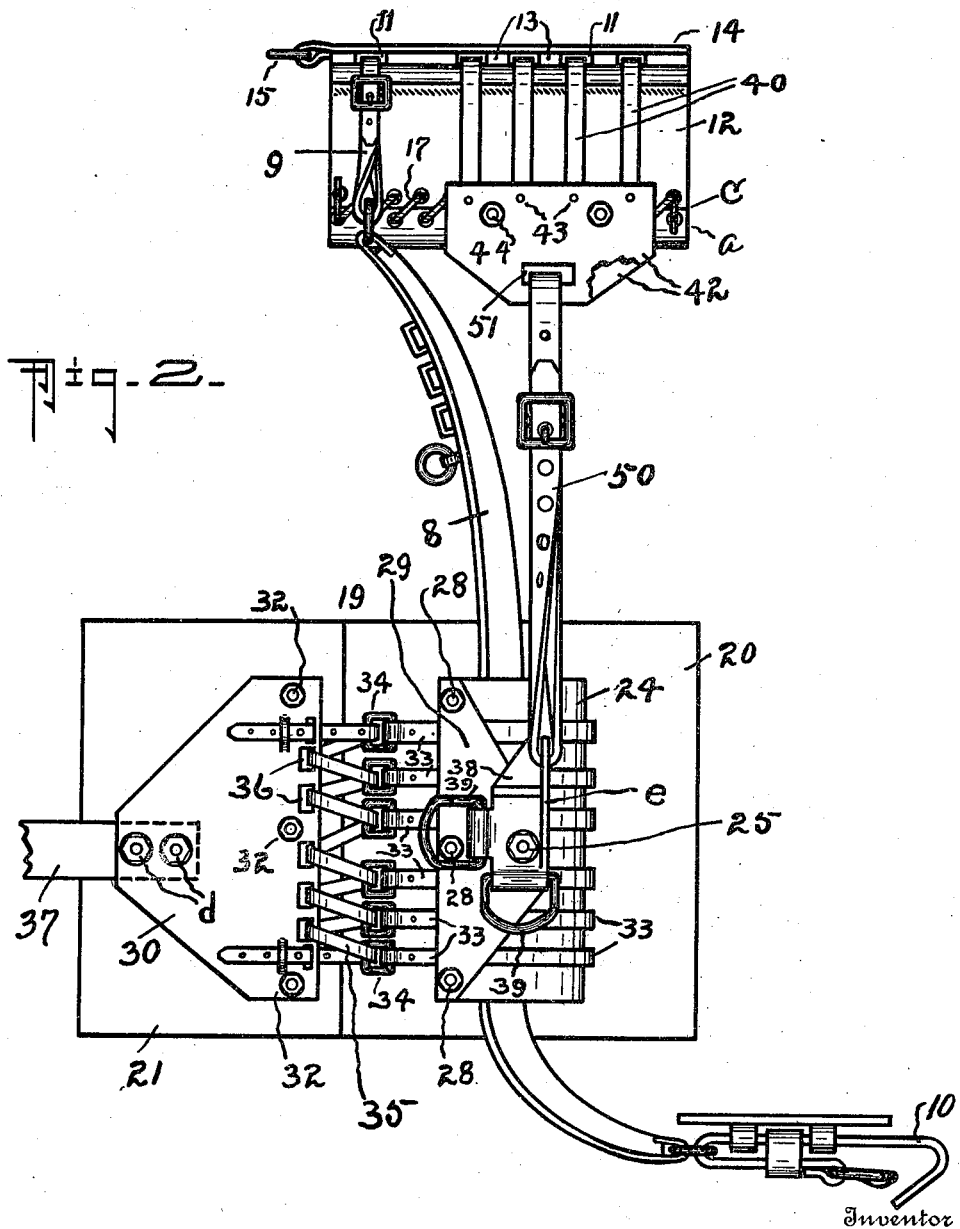

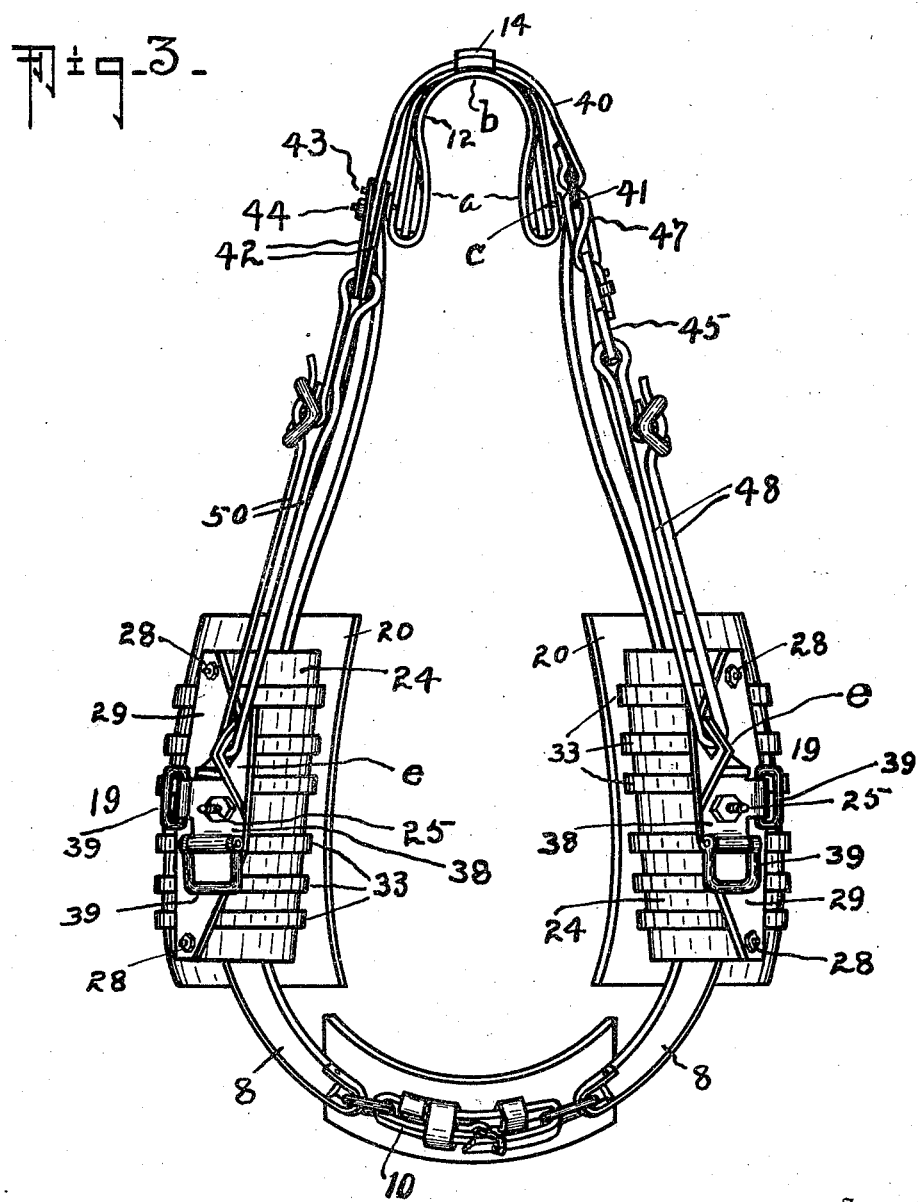

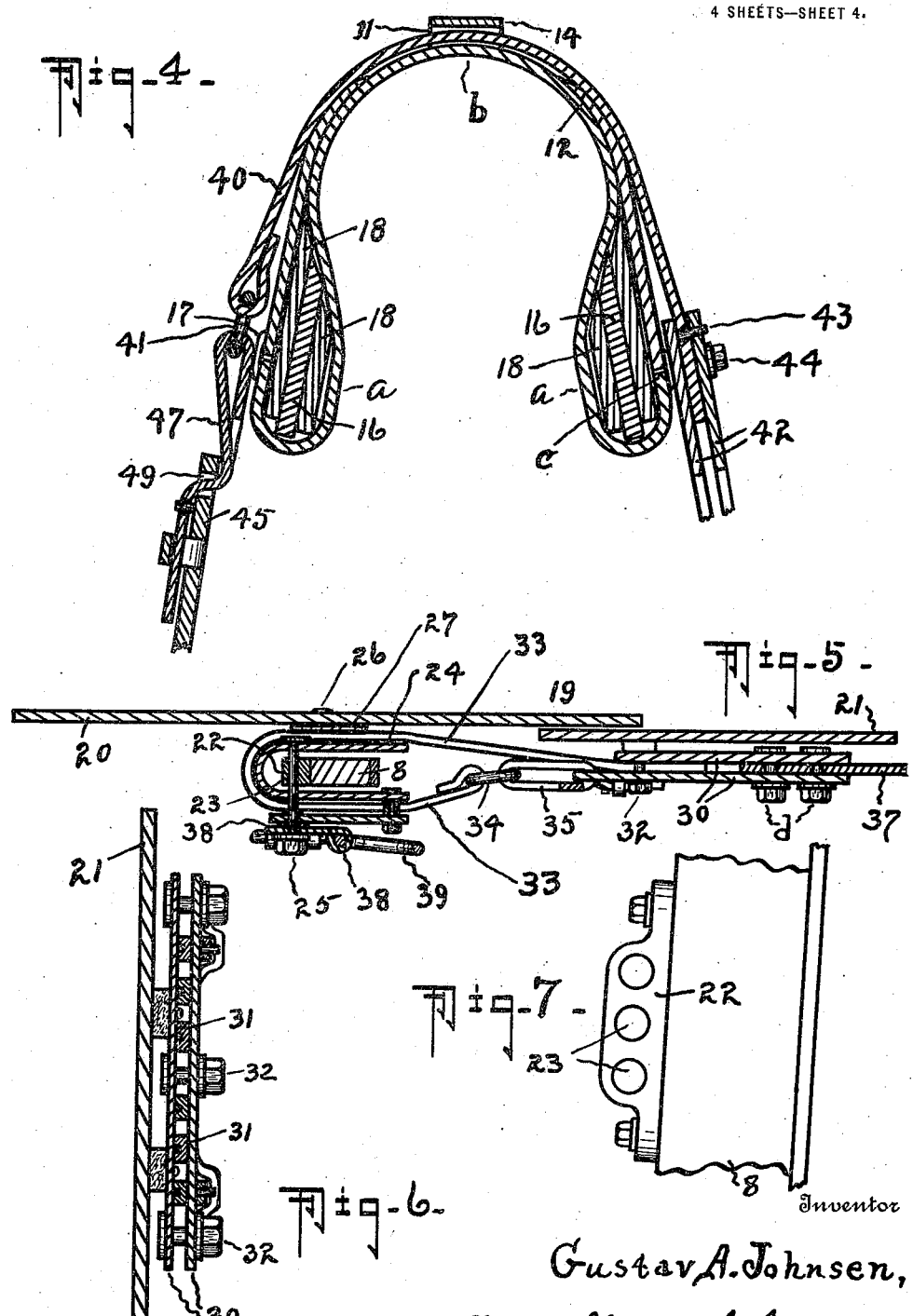

UNITED STATES PATENT OFFICE.

GUSTAV A. JOHNSEN, OF EMERSON, NEBRASKA.

HORSE-COLLAR.

1,298,732.    Specification of Letters Patent.    Patented Apr. 1, 1919.

Application filed January 26, 1918. Serial No. 214,009.

*To all whom it may concern:*

Be it known that I, GUSTAV A. JOHNSEN, a citizen of the United States, residing at Emerson, in the county of Dixon and State of Nebraska, have invented certain new and useful Improvements in Horse-Collars, of which the following is a specification.

This invention relates to improvements in horse collars, and has for one of its objects to provide such a construction that the hames will be supported to advantage for sustaining the stresses directed thereto, also to provide a collar which may be conveniently applied, will be durable in use, and may be conveniently manufactured.

Another object is to provide a horse collar consisting of a pair of side sections to which the tugs are attached, these sections being supported by a saddle or neck-pad and pivotally connected with the hames between the ends thereof so that the throat and breast of the animal may remain practically uncovered, said pivotal connections permitting a rocking movement of the sections so that stresses from the tugs will not cause an endwise movement of the hames. The invention also includes means for adjustments of the side sections, longitudinally of the hames, this being an advantage since horses vary in size and muscular development.

Another object is to provide a pair of side sections so arranged and supported from the top of the neck that they will bear upon the muscles at the sides of the shoulders and at such a distance from the throat that breathing will not be interfered with and that undue perspiration may be avoided.

Another object is the provision of means for making adjustments of the hames so that either the hames or side sections may be maintained at greater or lesser distances from the saddle or neck-pad, this being a desirable feature so that the collar may be used upon horses differing in shoulder development, also may be used upon horses having abrasions or gall sores upon the neck or shoulders.

Another object is is to provide a pair of side sections, each of which will consist of an outer and an inner wing, so that during operation, all of the stresses from the tugs will be directed to the outer wings, the inner wings being disposed in contact with the shoulder, this being for the purpose of preventing chafing or abrasions of the skin. The invention also includes flexible connections for the outer wings of the side sections with the hames to prevent a communication of sudden jolts or vibrations to the hames from the tugs.

The invention has reference to the provision of an elongated saddle or neck-pad so constructed that chafing of the upper part of the neck or injury to the mane may be avoided, also to such a mounting of the side sections upon the saddle that, during operation, the hames and side sections will be elevated or lowered automatically with reference to the saddle, according to the stresses directed to the side sections by the tugs, this being a matter of importance since it equalizes the draft, and prevents formation of gall sores generally occasioned by horse collars. Also the invention includes a saddle for the neck which will have a sufficient length so that the hames, when supported from the ends of the saddle, will cause a part of the stresses to be sustained by the neck as well as the shoulders.

With the foregoing objects in view and others to be hereinafter mentioned, the invention presents a novel construction, combination and arrangement of parts as described herein and claimed, and as illustrated in the accompanying drawing, wherein,—

Figure 1 is a view showing one of the sides of the collar. Fig. 2 is a view showing the side of the collar opposite to the side shown in Fig. 1, a part of a connecting-plate being broken away. Fig. 3 is a front view of the collar, the hames being connected. Fig. 4 is an enlarged detail showing the saddle or neck-pad in transverse section. Fig. 5 is a sectional view on line 5—5 of Fig. 1. Fig. 6 is a sectional view on line 6—6 of Fig. 1. Fig. 7 is a detail to clearly show one of the clips or brackets for the hames to provide a pivotal mounting for the side sections, and to provide longitudinal adjustments for said pivotal mounting.

Referring now to the drawing, numerals 8 indicate a pair of hames connected at their upper ends by the strap 9, their lower ends being adapted to be connected by the strap 10, the strap 9 being slidably disposed in one of the recesses 11 of the elongated saddle or neck-pad 12, said recesses being formed between the spacing-blocks 13 intermediate the top of the saddle 12 and the strip 14, said strip 14, at its rear end, being preferably provided with a ring 15 to which a part of a harness may be connected.

By referring to Fig. 4 it will be seen that the saddle 12 is provided at its lower part with a pair of lobes *a*, these being elongated, and of such form in transverse section that they project inwardly to engage the neck, above the shoulders, and have an arcuate part *b* at the upper part of the saddle. Also it will be noted that the upper end of the hames are so connected that these parts are disposed at the outer sides of the lobes *a*, and in operation the stresses from the upper ends of the hames will be directed to the lobes, the advantage on account of this feature being that the top of the neck beneath the rear end of the saddle will be relieved from any undue pressure.

Numerals 16 (Fig. 4.) indicate a pair of reinforcing strips which extend, preferably, the entire length of and are disposed within the lobes *a*, tending to prevent bending of the lobes transversely and thereby equalizing the transverse pressure directed thereto by the hames. The outer cover for the lobes is incised as indicated at *c*, the adjacent edges of the incisions being removably connected, preferably, by lacing-strands 17, as best shown in Figs. 1 and 2, so that flexible fillers 18 may be inserted.

As thus described the lobes operate as elongated holders or pockets, and may be readily opened for increasing or decreasing the quantity of the filler therein, and thereby the lobes may be changed in form to project inwardly for making a suitable contact with that part of the animal above the shoulders and below the mane whereby the formation of gall-sores may be prevented, and injury or undue wearing away of the mane also prevented since the mane will not be engaged by the saddle. It should be stated that the form of the saddle 12 and its length are quite necessary to operation, and the saddle should have a seating conforming to the shape of the top of the shoulders and neck in order to resist stresses, for during operation, the several straps 40 and 9, best shown in Figs. 1 and 2, play in the recesses 11, and have slidable movements therein, transversely of the saddle.

Numerals 19 indicate a pair of side sections, each consisting, in part, of an inner wing 20 and an outer wing 21, these wings being constructed of leather or other attenuated, flexible material, as may be desired.

Upon the inner, concaved part of each hame is mounted a bracket 22, best shown in Figs. 5 and 7, said bracket having apertures 23 formed therein at longitudinal intervals. I provide a pair of supporting-frames or rocker-members 24, as best shown in Fig. 5, each being preferably constructed of sheet metal and of U-shape in cross-section, and by means of their pivotal mounting, provided by the pair of pivot-pins or bolts 25 which loosely engage in apertures 23 of the brackets 22, they are adapted to have swinging movements on the hames.

The inner wings 20 of the side sections are secured to the metallic rocker-members 24 by means of rivets 26, spacing-strips 27 preferably being interposed between said inner wings and members 24. Upon the outer side of each U-shaped, metallic rocker 24 is mounted, by means of keepers 28, a supporting-plate 29, traversed by a bolt 25.

The outer wing 21 is provided with a pair of supporting-plates 30, as best shown in Fig. 6, said plates being maintained adjacent to each other by a plurality of spacing-blocks 31, and each outer wing and a pair of supporting-plates 30 are removably connected by bolts 32.

Numerals 33 indicate a plurality of flexible loops, each being provided with a ring 34, and by means of a lacing-strip 35, engaging in apertures 36 of the pair of plates 30 and in rings 34, each outer wing 21 may have a mounting independent of the inner wing 20, the flexible loops 33 being in engagement with the convexed side of members 24 and being slidable thereon, and being disposed beneath the supporting-plate 29 and also being disposed between the spacing-strips 27 and inner wings.

On account of the construction just described, the outer wings 21, to which the tugs 37 are attached by bolts *d*, may have swinging movements independently of the inner wings 20, so that the latter will not cause chafing of the skin of the animal; also the flexible connection provided by the strap 35 permits adjustments to be made so that the outer wing may be disposed forwardly or rearwardly with reference to the inner wing, and if one of the flexible loops 33 becomes injured or broken, a new one may be conveniently replaced.

Upon each bolt 25, which provides a pivotal mounting for a rocker 24, is mounted a bracket 38 which is provided with rings 39 for a convenient connection with parts of a harness, and provided also with an apertured flange *e*.

Slidably mounted in recesses 11 are a plurality of flexible straps 40, each being provided with a ring 41 at one of its ends, the opposite ends of these straps being disposed between the pair of connecting-plates 42, as best shown in Figs. 2 and 4, said straps being supported by pins 43 which have bearings in said plates. The plates 42 are held together by means of stud-bolts 44, and therefore if one of the straps 40 becomes injured it may be readily removed, and replaced by another.

Numeral 45 indicates a single connecting-plate provided with apertures 46 in its upper end for receiving a lacing-strip 47 which engages in the rings 41 of straps 40 and in said apertures 46, and it will be appreciated that, by means of the lacing-strip, the plate 45 may be adjusted to positions near to or more remote from the saddle.

Numeral 48, best shown in Fig. 1, indicates an adjusting strap which engages in the aperture of the flange e of the bracket 38 and in the aperture 49 of the plate 45, and by its use, the front end of one of the side sections may be elevated or lowered, and as best shown in Fig. 2, an adjusting strap 50 is also employed, this being in all respects the same as the strap 48, said strap 50 engaging in the apertures 51 of the pair of connecting-plates 42 and an apertured flange e of a bracket 38.

As described, it will be noted that on account of the length of the saddle 12 and parts connected therewith, the hames are provided with two supports, one being the strap 9 at the rear end of the saddle, said strap connecting with the upper ends of the hames, the other being the straps 48 and 50 at or near the front end of the saddle, connecting with the lower part of the hames. By this arrangement two important advantages are derived, one being that the wings are caused to be disposed, normally, adjacent to the muscles of the breast and shoulders instead of in contact therewith at times when stresses are not directed to the tugs, to prevent resulting heat and perspiration which is usually occasioned in the use of collars of ordinary construction which circumscribe the neck; another advantage of importance being that when stresses are directed to the hames by the tugs, a part of the stresses will be sustained by the front part of the saddle, the rearward movement of the side sections being communicated to said front part of the saddle by said straps 48 and 50.

Since the straps 40 are slidably mounted in the recesses 11 as well as the strap 9, it is considered that this feature causes an equalization of the draft, and that substantially equal stresses will be directed to the hames by the tugs, for it will be understood that if resistance is applied to one tug by a load, the straps 40 and 9 may slide in said recesses.

While I have described construction in detail, it has been for the purpose of clearly explaining the preferred arrangement of parts, and I may change the details in minor particulars if found to be of advantage, and size, form and proportion of parts may be changed without departing from the spirit of the invention, the scope thereof being determined by the appended claims.

I claim,—

1. A horse collar, comprising, in combination with a pair of hames, an elongated saddle member provided with recesses near its ends and opening on its sides, a strap slidably disposed in a recess near one end of the elongated saddle for connecting the upper ends of the hames, side sections mounted on the hames, and a plurality of straps slidably disposed in the recesses near the opposite end of the elongated saddle and provided with devices for a connection with and between the ends of said hames.

2. A horse collar consisting of an elongated saddle, a flexible member on the saddle adapted to slide transversely thereof and connecting the upper ends of the hames, a pair of side sections adapted to be connected with the tugs, each side section having a pivotal mounting upon and between the ends of a hame, and a plurality of flexible members having a connection with the side sections and adapted to have slidable movements upon and transversely of the saddle.

3. A horse collar consisting of a saddle, a strap on the saddle for connecting the upper ends of the hames, a plurality of flexible loops circumscribing the hames, a pair of flexible wings disposed on the inner sides and having a pivotal connection with the hames, a second pair of flexible wings disposed outwardly of the flexible wings of the first pair, each flexible wing of the second pair being connected with a tug and having a connection with the flexible loops of a hame, and a flexible member on the saddle having a connection with the first named pair of flexible wings.

4. A horse collar, comprising, in combination with a pair of flexibly connected hames each being provided intermediate its ends with a pivot-pin, a pair of supporting-frames mounted for swinging movements on the pivot-pins, flexible loops circumscribing the hames and supporting-frames, a pair of flexible wings at the inner sides of the hames each being movable with a supporting-frame, a second pair of flexible wings each being connected with a tug and disposed at the outer side of a flexible wing of the first pair and flexibly connected with the loops of a hame.

5. A horse collar, comprising, in combination with a pair of flexibly connected hames, a pair of side sections mounted for swinging movements upon the hames, each side section including a flexible wing disposed at the inner side of a hame and a second flexible wing disposed outwardly of a first named wing for a connection with a tug.

6. A horse collar, comprising, in combination with a pair of hames, an elongated saddle member provided with recesses near its ends to open on its sides, a strap slidably mounted in a recess near the rear end of the saddle for connecting the upper ends of the hames, side sections mounted on the hames, a plurality of straps slidably mounted in the recesses near the front end of the saddle and provided with devices for a connection with the side sections, and devices engaging the side sections and hames for adjusting the mounting of the side sections at longitudinal intervals of the hames.

7. A horse collar consisting of an elongated saddle, a longitudinally adjustable, flexible member on the saddle adapted to slide transversely thereof and connecting the upper ends of the hames, a pair of side sections adapted to be connected with the tugs, each side section having a pivotal mounting upon a hame, means to adjust the pivotal mounting of each side section longitudinally of a hame, and a plurality of flexible members having a connection with the side sections and adapted to have slidable movements transversely of and in engagement with the saddle.

8. A horse collar consisting of a saddle, a longitudinally adjustable strap on the saddle for connecting the upper ends of the hames, a plurality of flexible loops circumscribing the hames, a pair of flexible wings disposed at the inner sides and having a pivotal connection with the hames, means to adjust the pivotal connection of said wings longitudinally of the hames, a second pair of flexible wings disposed outwardly of and adjacent to the flexible wings of the first pair, each flexible wing of the second pair being connected with a tug and having a connection with the flexible loops of a hame, a flexible member on the saddle having a connection with the flexible wings of the first named pair, and means to adjust the connection of the wings of the second pair with the loops of the hames to permit said wings to be disposed at selected distances from said loops.

9. A horse collar, comprising, in combination with a pair of flexibly connected hames each being provided with a pivot-pin, a pair of supporting-frames mounted for rocking movements on the pivot-pins, flexible loops circumscribing the hames and supporting-frames, a pair of flexible wings at the inner sides of the hames, each being movable with a supporting-frame, a second pair of flexible wings each being connected with a tug and disposed at the outer side of a flexible wing of the first pair and flexibly connected with the loops of a hame, means for adjusting the flexible connection of the flexible wings of the second pair to dispose them at selected distances from the supporting-frames, and means to adjust each pivot-pin to dispose it at selected intervals longitudinally of a hame.

10. A horse collar, comprising a saddle, a plurality of straps engaging and adapted to have slidable movements transversely of the saddle and having a connection with the hames, a pair of side sections pivotally mounted on the hames, each side section including a flexible wing disposed at the inner side of a hame and a second flexible wing disposed outwardly of a first named wing for a connection with a tug, and means to adjust the pivotal mounting of the side sections longitudinally of the hames.

11. A horse collar consisting of a saddle, a strap on the saddle for connecting the upper ends of the hames, a plurality of flexible loops circumscribing the hames, a pair of flexible wings disposed at the inner sides and having a pivotal connection with the hames, means to adjust the pivotal connection of said wings longitudinally of the hames, a second pair of flexible wings for a connection with a pair of tugs and disposed outwardly of and adjacent to the flexible wings of the first pair, apertured reinforcing-plates on the flexible wings of the second pair, lacing-strands connecting the reinforcing-plates with the flexible loops of the hames, and a longitudinally adjustable member on the saddle having a connection with the flexible wings of the first named pair.

In testimony whereof, I have affixed my signature in presence of two witnesses.

GUSTAV A. JOHNSEN.

Witnesses:
D. C. LEAMER,
C. E. TEN EYCK.

Copies of this patent may be obtained for five cents each, by addressing the "Commissioner of Patents, Washington, D. C."